US012380689B2

(12) United States Patent
Gupta et al.

(10) Patent No.: US 12,380,689 B2
(45) Date of Patent: Aug. 5, 2025

(54) MANAGING OCCLUSION IN SIAMESE TRACKING USING STRUCTURED DROPOUTS

(71) Applicant: QUALCOMM Technologies, Inc., San Diego, CA (US)

(72) Inventors: Deepak Kumar Gupta, Amsterdam (NL); Efstratios Gavves, Amsterdam (NL); Arnold Wilhelmus Maria Smeulders, Amsterdam (NL)

(73) Assignee: QUALCOMM Incorporated, San Diego, CA (US)

( * ) Notice: Subject to any disclaimer, the term of this patent is extended or adjusted under 35 U.S.C. 154(b) by 394 days.

(21) Appl. No.: 17/794,555

(22) PCT Filed: Mar. 18, 2021

(86) PCT No.: PCT/US2021/023045
§ 371 (c)(1),
(2) Date: Jul. 21, 2022

(87) PCT Pub. No.: WO2021/188843
PCT Pub. Date: Sep. 23, 2021

(65) Prior Publication Data
US 2023/0070439 A1    Mar. 9, 2023

(30) Foreign Application Priority Data
Mar. 18, 2020   (GR) .............................. 20200100142

(51) Int. Cl.
*G06V 10/82*    (2022.01)
*G06T 5/20*    (2006.01)
*G06T 7/73*    (2017.01)

(52) U.S. Cl.
CPC ................ *G06V 10/82* (2022.01); *G06T 5/20* (2013.01); *G06T 7/73* (2017.01); *G06T 2207/20076* (2013.01); *G06T 2207/20084* (2013.01)

(58) Field of Classification Search
CPC .. G06V 10/82; G06T 5/20; G06T 7/73; G06T 2207/20076; G06T 2207/20084; G06F 18/21
(Continued)

(56) References Cited

U.S. PATENT DOCUMENTS

2006/0036399 A1* 2/2006 Yang ...................... G06V 10/76
702/181
2017/0078587 A1* 3/2017 Guo ........................ G06T 7/246
2018/0012078 A1* 1/2018 Pournaghi ................. G06T 7/77

FOREIGN PATENT DOCUMENTS

WO    2020038589 A1    2/2020

OTHER PUBLICATIONS

Guo J., et al., "Stochastic Channel Decorrelation Network and Its Application to Visual Tracking", arxiv.org, Cornell University Library, 201 Olin Library Cornell University Ithaca, NY, 14853, Jul. 3, 2018 (Jul. 3, 2018), 8 Pages, XP081261694, the whole document.
(Continued)

*Primary Examiner* — Charlotte M Baker
(74) *Attorney, Agent, or Firm* — QUALCOMM Incorporated

(57) ABSTRACT

A method for object tracking includes receiving a target image of an object of interest. Latent space features of the target image is modified at a forward pass for a neural network by dropping at least one channel of the latent space features, dropping a channel corresponding to a slice of the latent space features, or dropping one or more features of the latent space features. At the forward pass, a location of the object of interest in a search image is predicted based on the
(Continued)

modified latent space features. The location of the object of interest is identified by aggregating predicted locations from the forward pass.

28 Claims, 9 Drawing Sheets

(58) Field of Classification Search
USPC .......................................................... 382/103
See application file for complete search history.

(56) References Cited

OTHER PUBLICATIONS

International Search Report and Written Opinion—PCT/US2021/023045—ISA/EPO—Jun. 15, 2021.

* cited by examiner

MANAGING OCCLUSION IN SIAMESE TRACKING USING STRUCTURED DROPOUTS

CROSS-REFERENCE TO RELATED APPLICATION

The present application claims priority to Greece Patent Application No. 20200100142, filed on Mar. 18, 2020, and titled "MANAGING OCCLUSION IN SIAMESE TRACKING USING STRUCTURED DROPOUTS," the disclosure of which is expressly incorporated by reference in its entirety.

FIELD OF DISCLOSURE

Aspects of the present disclosure generally relate to object tracking.

BACKGROUND

An artificial neural network, which may comprise an interconnected group of artificial neurons (e.g., neuron models), is a computational device, or represents a method to be performed by a computational device. The artificial neural network may be used for various applications and/or devices, such as Internet Protocol (IP) cameras, Internet of Things (IoT) devices, machine vision, object tracking, autonomous vehicles, and/or service robots.

An artificial neural network, such as a convolutional neural network (CNN), may be trained to identify objects in an image or a sequence of images (e.g., a video). For example, a CNN may be trained to identify and track objects captured by one or more sensors, such as light detection and ranging (LIDAR) sensors, sonar sensors, red-green-blue (RGB) cameras, RGB-depth (RGB-D) cameras, and the like. The sensors may be coupled to, or in communication with, a device, such as an autonomous vehicle.

Object trackers face a variety of challenges when tracking an object. These challenges include, for example, appearance variations, occlusion, clutter, and/or sampling drift. As such, it is desirable to improve object trackers to be more robust in view of the aforementioned challenges.

SUMMARY

In an aspect of the present disclosure, a method for object tracking is provided. The method includes receiving a target image of an object of interest. The method also includes modifying latent space features of the target image at a forward pass for a neural network. Additionally, the method includes predicting, at the forward pass, a location of the object of interest in a search image based on the modified latent space features. Further, the method includes identifying the location of the object of interest by aggregating predicted locations from the forward pass.

In an aspect of the present disclosure, an apparatus for object tracking is provided. The apparatus includes a memory and one or more processors coupled to the memory. The processor(s) are configured to receive a target image of an object of interest. The processor(s) are also configured to modify latent space features of the target image at a forward pass for a neural network. In addition, the processor(s) are configured to predict, at the forward pass, a location of the object of interest in a search image based on the modified latent space features. Further, the processor(s) are configured to identify the location of the object of interest by aggregating predicted locations from the forward pass.

In an aspect of the present disclosure, an apparatus for object tracking is provided. The apparatus includes means for receiving a target image of an object of interest. The apparatus also includes means for modifying latent space features of the target image at a forward pass for a neural network. Additionally, the apparatus includes means for predicting, at the forward pass, a location of the object of interest in a search image based on the modified latent space features. Further, the apparatus includes means for identifying the location of the object of interest by aggregating predicted locations from the forward pass.

In an aspect of the present disclosure, a non-transitory computer readable medium is provided. The computer readable medium has encoded thereon program code for object tracking. The program code is executed by a processor and includes code to receive a target image of an object of interest. The program code also includes code to modify latent space features of the target image at a forward pass for a neural network. Additionally, the program code includes code to predict, at the forward pass, a location of the object of interest in a search image based on the modified latent space features. Furthermore, the program code includes code to identify the location of the object of interest by aggregating predicted locations from the forward pass.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
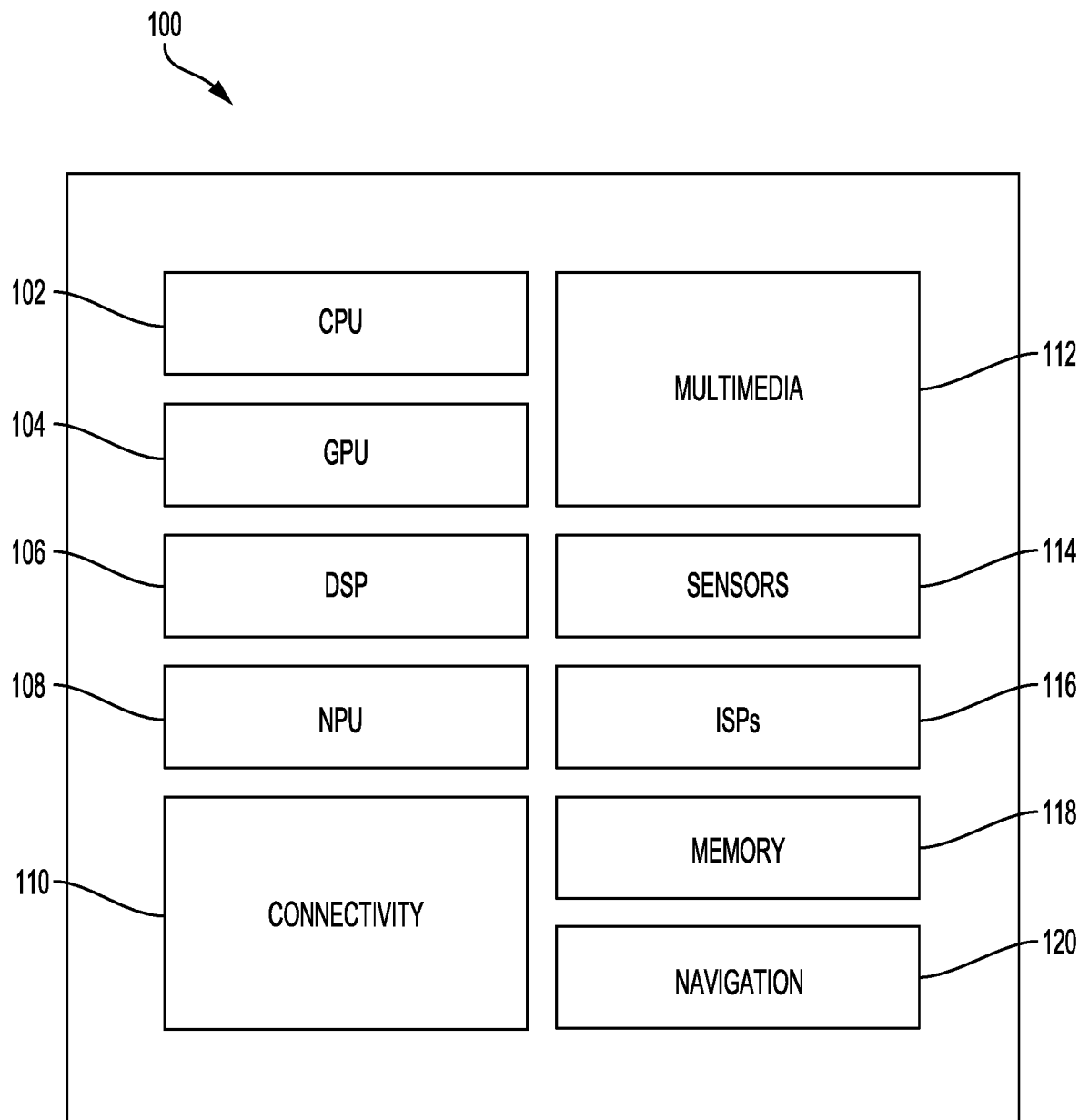
FIG. 1 illustrates an example implementation of designing a neural network using a system-on-a-chip (SOC), including a general-purpose processor in accordance with certain aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed, whether implemented independently of or combined with any other aspect of the disclosure. For example, an apparatus may be implemented or a method may be practiced using any number of the aspects set forth. In addition, the scope of the disclosure is intended to cover such an apparatus or method which is practiced using other structure, functionality, or structure and functionality in addition to or other than the various aspects of the disclosure set forth. It should be understood that any aspect of the disclosure disclosed may be embodied by one or more elements of a claim.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Object tracking refers to the problem of identifying the state of an object of interest in each frame of a given video based on an accurate initial state provided in the first frame of the video. Object tracking involves the prediction of a location of a target object throughout the video sequence based on a ground truth label that is only provided for a first frame of the video sequence. As discussed, object trackers face a variety of challenges when tracking an object. Conventional object trackers may fail to track an object due to appearance variations, occlusion, clutter, sampling drift, and/or other tracking challenges. With the advent of popular deep learning methods, tracking systems (e.g., CNN-based tracking systems) may learn filters related to the object of interest.

Filters may improve a discriminative power of an object tracker. Some conventional systems have focused on embedding larger and more powerful backbones (e.g., a CNN) into the tracking model. Although increasing a processing power of the backbone may improve tracking accuracy, the increased processing power may decrease tracking speed.

Aspects of the present disclosure are directed to a dropout mechanism to account for occlusion-related errors and adverse effects of appearance variations.

FIG. 1 illustrates an example implementation of a system-on-a-chip (SOC) 100, which may include a central processing unit (CPU) 102 or a multi-core CPU configured for object tracking, in accordance with certain aspects of the present disclosure. Variables (e.g., neural signals and synaptic weights), system parameters associated with a computational device (e.g., neural network with weights), delays, frequency bin information, and task information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, or may be distributed across multiple blocks. Instructions executed at the CPU 102 may be loaded from a program memory associated with the CPU 102 or may be loaded from a memory block 118.

The SOC 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth connectivity, and the like, and a multimedia processor 112 that may, for example, detect and recognize gestures. In one implementation, the NPU is implemented in the CPU, DSP, and/or GPU. The SOC 100 may also include a sensor processor 114, image signal processors (ISPs) 116, and/or navigation module 120, which may include a global positioning system.

The SOC 100 may be based on an ARM instruction set. In an aspect of the present disclosure, the instructions loaded into the general-purpose processor 102 may comprise code to receive a target image of an object of interest. The general-purpose processor 102 may also comprise code to modify latent space features of the target image at a forward pass for a neural network. The general-purpose processor 102 may further comprise code to predict, at the forward pass, a location of the object of interest in a search image based on the modified latent space features. The general-purpose processor 102 may still further comprise code to identify the location of the object of interest by aggregating predicted locations from the forward pass.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 2A:
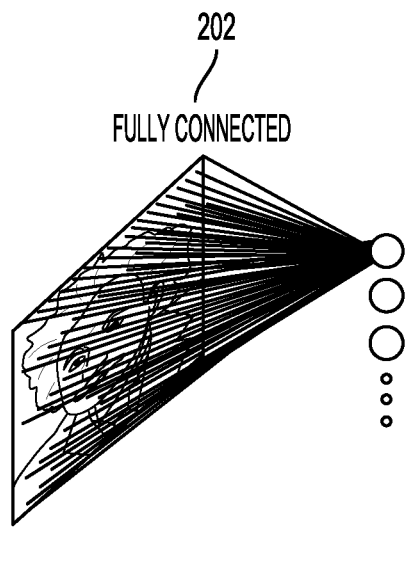
FIGS. 2A, 2B, and 2C are diagrams illustrating a neural network in accordance with aspects of the present disclosure.
Figure 2B:
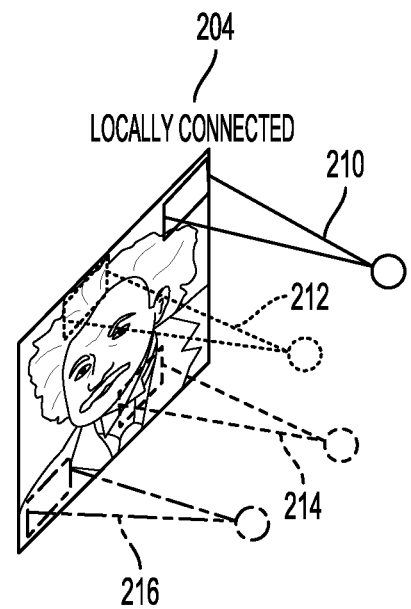

The connections between layers of a neural network may be fully connected or locally connected. FIG. 2A illustrates an example of a fully connected neural network 202. In a fully connected neural network 202, a neuron in a first layer may communicate its output to every neuron in a second layer, so that each neuron in the second layer will receive input from every neuron in the first layer. FIG. 2B illustrates an example of a locally connected neural network 204. In a locally connected neural network 204, a neuron in a first layer may be connected to a limited number of neurons in the second layer. More generally, a locally connected layer of the locally connected neural network 204 may be configured so that each neuron in a layer will have the same or a similar connectivity pattern, but with connections strengths that may have different values (e.g., 210, 212, 214, and 216). The locally connected connectivity pattern may give rise to spatially distinct receptive fields in a higher layer, because the higher layer neurons in a given region may receive inputs that are tuned through training to the properties of a restricted portion of the total input to the network.

Figure 2C:
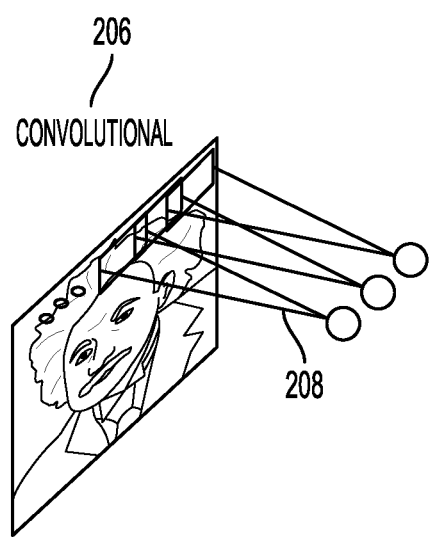

One example of a locally connected neural network is a convolutional neural network. FIG. 2C illustrates an example of a convolutional neural network 206. The convolutional neural network 206 may be configured such that the connection strengths associated with the inputs for each neuron in the second layer are shared (e.g., 208). Convolutional neural networks may be well suited to problems in which the spatial location of inputs is meaningful.

Figure 2D:
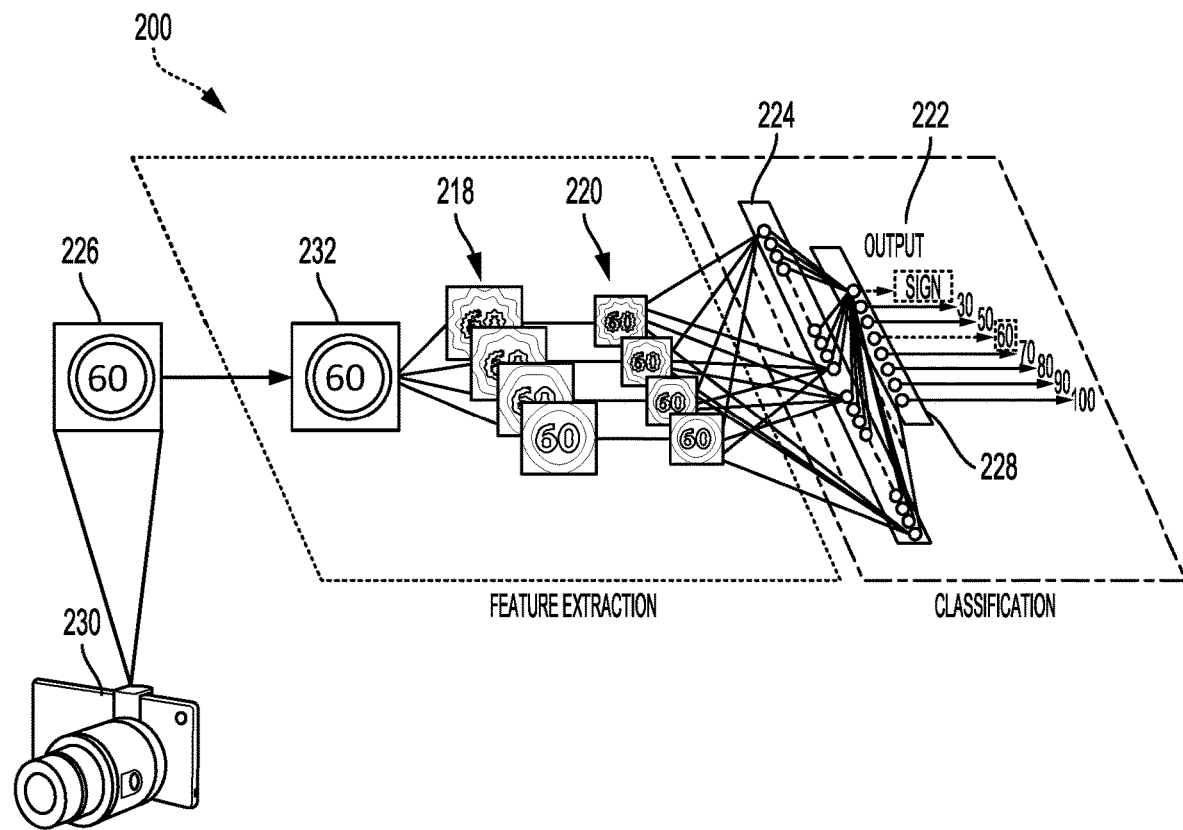
FIG. 2D is a diagram illustrating an exemplary deep convolutional network (DCN) in accordance with aspects of the present disclosure.

One type of convolutional neural network is a deep convolutional network (DCN). FIG. 2D illustrates a detailed example of a DCN 200 designed to recognize visual features from an image 226 input from an image capturing device 230, such as a car-mounted camera. The DCN 200 of the current example may be trained to identify traffic signs and a number provided on the traffic sign. Of course, the DCN 200 may be trained for other tasks, such as identifying lane markings or identifying traffic lights.

The DCN 200 may be trained with supervised learning. During training, the DCN 200 may be presented with an image, such as the image 226 of a speed limit sign, and a forward pass may then be computed to produce an output 222. The DCN 200 may include a feature extraction section and a classification section. Upon receiving the image 226, a convolutional layer 232 may apply convolutional kernels (not shown) to the image 226 to generate a first set of feature maps 218. As an example, the convolutional kernel for the convolutional layer 232 may be a 5×5 kernel that generates 28×28 feature maps. In the present example, because four different feature maps are generated in the first set of feature maps 218, four different convolutional kernels were applied to the image 226 at the convolutional layer 232. The convolutional kernels may also be referred to as filters or convolutional filters.

The first set of feature maps 218 may be subsampled by a max pooling layer (not shown) to generate a second set of feature maps 220. The max pooling layer reduces the size of the first set of feature maps 218. That is, a size of the second set of feature maps 220, such as 14×14, is less than the size of the first set of feature maps 218, such as 28×28. The reduced size provides similar information to a subsequent layer while reducing memory consumption. The second set of feature maps 220 may be further convolved via one or more subsequent convolutional layers (not shown) to generate one or more subsequent sets of feature maps (not shown).

In the example of FIG. 2D, the second set of feature maps 220 is convolved to generate a first feature vector 224. Furthermore, the first feature vector 224 is further convolved to generate a second feature vector 228. Each feature of the second feature vector 228 may include a number that corresponds to a possible feature of the image 226, such as "sign," "60," and "100." A softmax function (not shown) may convert the numbers in the second feature vector 228 to a probability. As such, an output 222 of the DCN 200 is a probability of the image 226 including one or more features.

In the present example, the probabilities in the output 222 for "sign" and "60" are higher than the probabilities of the others of the output 222, such as "30," "40," "50," "70," "80," "90," and "100". Before training, the output 222 produced by the DCN 200 is likely to be incorrect. Thus, an error may be calculated between the output 222 and a target output. The target output is the ground truth of the image 226 (e.g., "sign" and "60"). The weights of the DCN 200 may then be adjusted so the output 222 of the DCN 200 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with new images (e.g., the speed limit sign of the image 226) and a forward pass through the network may yield an output 222 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 220) receiving input from a range of neurons in the previous layer (e.g., feature maps 218) and from each of the multiple channels. The values in the feature map may be further processed with a non-linearity, such as a rectification, max(0, x). Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 3:
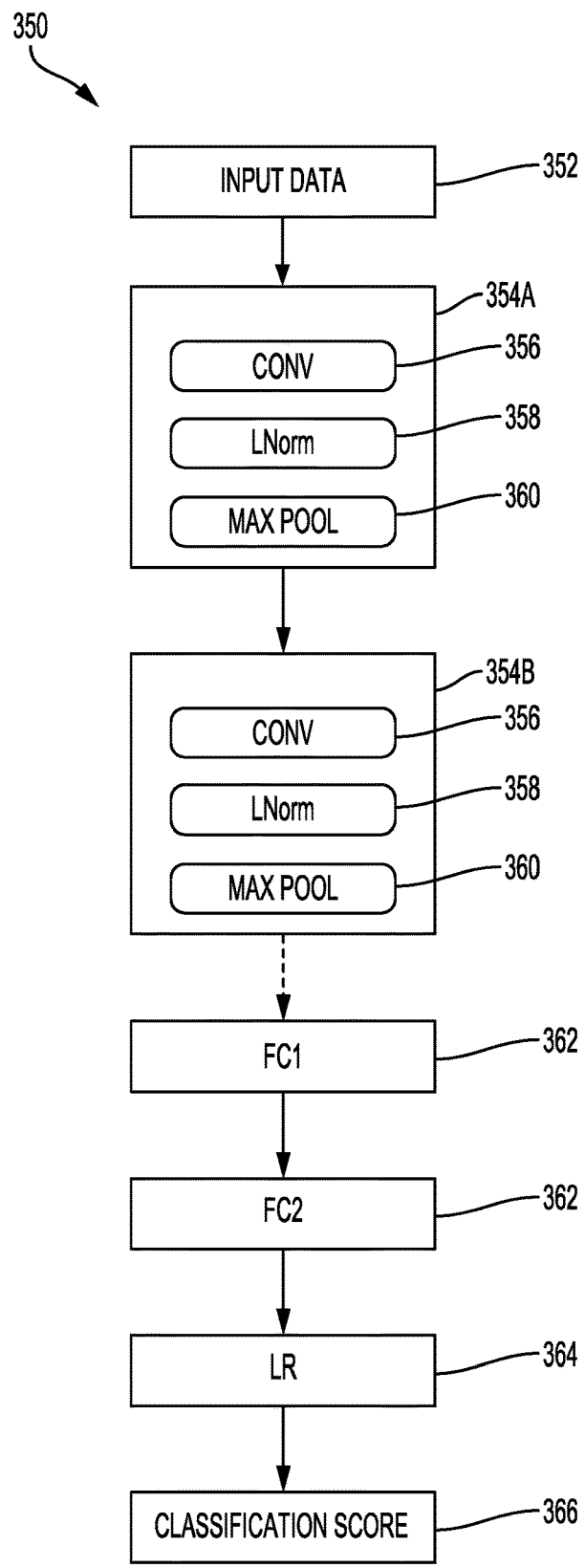
FIG. 3 is a block diagram illustrating an exemplary deep convolutional network (DCN) in accordance with aspects of the present disclosure.

FIG. 3 is a block diagram illustrating a deep convolutional network 350. The deep convolutional network 350 may include multiple different types of layers based on connectivity and weight sharing. As shown in FIG. 3, the deep convolutional network 350 includes the convolution blocks 354A, 354B. Each of the convolution blocks 354A, 354B may be configured with a convolution layer (CONV) 356, a normalization layer (LNorm) 358, and a max pooling layer (MAX POOL) 360.

The convolution layers 356 may include one or more convolutional filters, which may be applied to the input data to generate a feature map. Although only two of the convolution blocks 354A, 354B are shown, the present disclosure is not so limiting, and instead, any number of the convolution blocks 354A, 354B may be included in the deep convolutional network 350 according to design preference. The normalization layer 358 may normalize the output of the convolution filters. For example, the normalization layer 358 may provide whitening or lateral inhibition. The max pooling layer 360 may provide down sampling aggregation over space for local invariance and dimensionality reduction.

The parallel filter banks, for example, of a deep convolutional network may be loaded on a CPU 102 or GPU 104 of an SOC 100 to achieve high performance and low power consumption. In alternative embodiments, the parallel filter banks may be loaded on the DSP 106 or an ISP 116 of an SOC 100. In addition, the deep convolutional network 350 may access other processing blocks that may be present on the SOC 100, such as sensor processor 114 and navigation module 120, dedicated, respectively, to sensors and navigation.

The deep convolutional network 350 may also include one or more fully connected layers 362 (FC1 and FC2). The deep convolutional network 350 may further include a logistic regression (LR) layer 364. Between each layer 356, 358, 360, 362, 364 of the deep convolutional network 350 are weights (not shown) that are to be updated. The output of each of the layers (e.g., 356, 358, 360, 362, 364) may serve as an input of a succeeding one of the layers (e.g., 356, 358, 360, 362, 364) in the deep convolutional network 350 to learn hierarchical feature representations from input data 352 (e.g., images, audio, video, sensor data and/or other input data) supplied at the first of the convolution blocks 354A. The output of the deep convolutional network 350 is a classification score 366 for the input data 352. The classification score 366 may be a set of probabilities, where each probability is the probability of the input data, including a feature from a set of features.

As discussed, appearance variations, occlusion, clutter, and sampling drift, are among numerous challenges in object tracking. Occlusion issues may be particularly challenging. Occlusion may occur when a portion of a target is hidden or obstructed from view. As such, some prominent features of a search object or target object may be unavailable. Thus, a similarity score of a search object and the target object may be reduced. Accordingly, a confidence score for prediction of the location of the target may likewise be reduced.

To reduce the uncertainty in prediction due to missing features, aspects of the present disclosure perform dropouts, such as stochastic dropouts, of a partial set of channels or a patch from the latent feature map of the target image. Multiple inferences (e.g., predictions) with the dropouts may be performed. The inferences may then be aggregated. As a result, performance of the tracker model may be improved in the presence of occlusion. To further handle occlusion scenarios, a non-stochastic slice dropout method may be used.

It may be beneficial for the model to look at variants of the target image in the latent space. Accordingly, in some aspects, when searching for an object in the candidate image, the model infers over the variations. In addition, when searching for the object, the activation scores may be improved by inferring over the variations.

Figure 4:
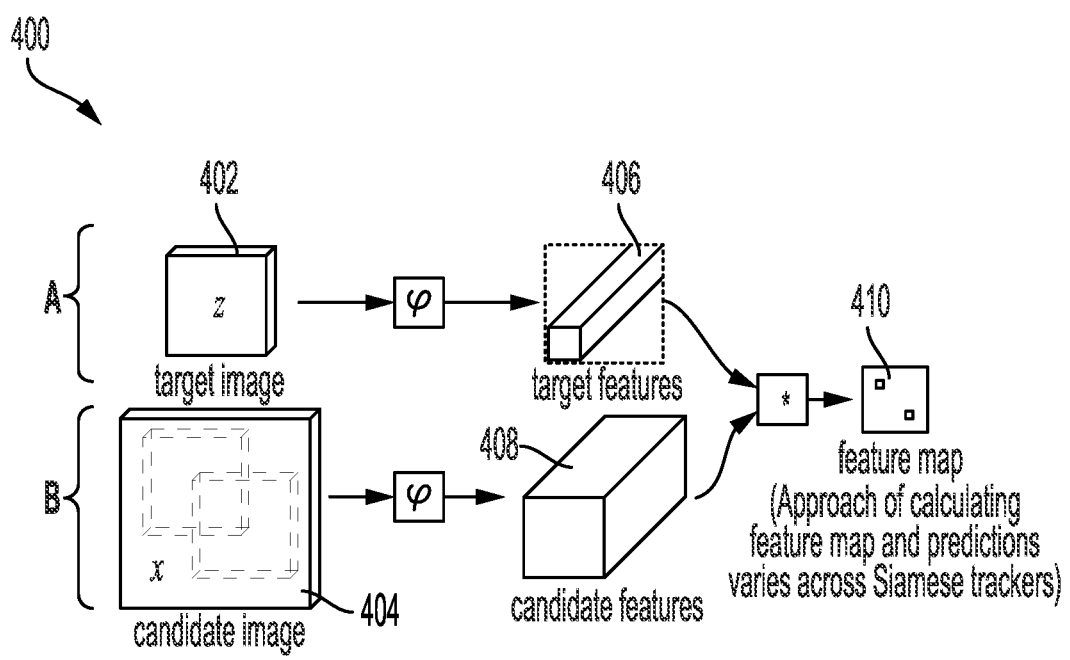
FIG. 4 is a block diagram illustrating an example architecture for object tracking, in accordance with aspects of the present disclosure.

FIG. 4 is a block diagram illustrating an example architecture 400 for object tracking, in accordance with aspects of the present disclosure. Referring to FIG. 4, the example architecture 400 is in the form of a Siamese network. However this is merely exemplary, and other architectures for object tracking may also be used. A Siamese network is a neural network architecture that includes two subnetworks that have the same or similar configuration with parameters and weights. Siamese networks may be useful for comparing two inputs to determine a similarity score indicating whether the inputs match.

As shown in FIG. 4, the example architecture 400 receives as inputs, a target image 402 and a candidate image 404. Each of the subnetworks (e.g., A, B) of the example architecture 400 may separately process the target image 402 and the candidate image 404, respectively. During tracking, localization of the target image 402 in the candidate image 404 may be found through matching in the latent space. The latent representations $\varphi(z)$ (406) and $\varphi(x)$ (408) may be obtained by subjecting the target image 402 and the candidate image 404 through layers of convolutional filters to extract a set of features 406, 408, respectively. In some aspects, each of the subnetworks (A, B) may be configured as an auto-encoder. In such a configuration, latent representations may be generated via encoding portions of each subnetwork.

The latent representations (e.g., target feature 406 and candidate features 408) may be cross-correlated and combined to produce a single feature map 410. The peak energy in the feature map 410 may correspond to the location of the target image 402 in the candidate image 404. In some aspects, a Siamese tracker may employ different mechanisms to localize the final bounding box output from the target features 406 and the candidate features 408. For example, a Siamese tracker may generate a feature map by matching a candidate with a target at several different scales. The feature map pixel with the highest value may be translated back to the bounding box as a prediction of the location of the target image in the candidate image. In another example, a Siamese tracker may use a region proposal network to regress the desired bounding box.

As discussed, in the case of appearance variations, occlusion, clutter, or sampling drift, the variation in energy in the feature map 410 may be decreased and the resulting prediction or confidence score may be reduced, thereby limiting the effectiveness of the object tracker.

To address this issue, aspects of the present disclosure may modify the target features 406 to mimic occlusion or other appearance variations using structured dropout.

Figure 5:
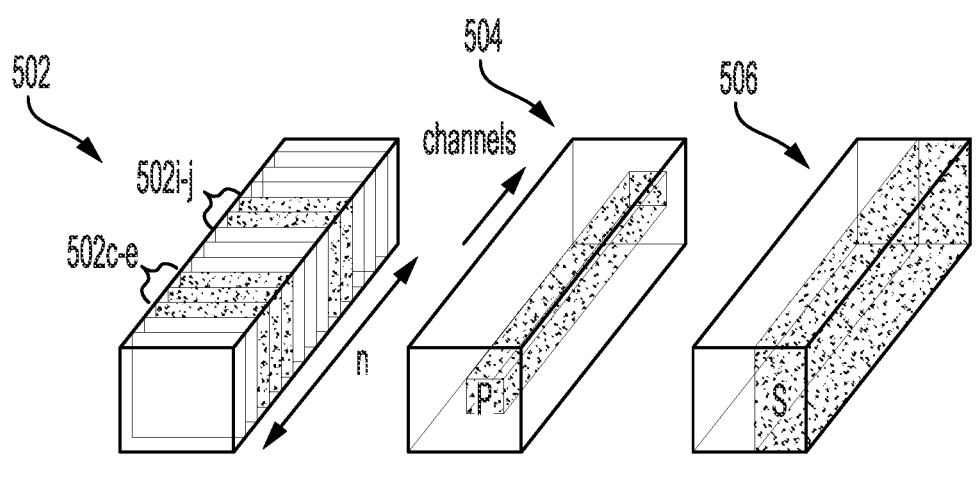
FIG. 5 is a block diagram illustrating example approaches for modifying target features using structured dropout to model appearance variations, in accordance with aspects of the present disclosure

FIG. 5 is a block diagram illustrating example approaches for modifying target features using structured dropout to model appearance variations, in accordance with aspects of the present disclosure. Referring to FIG. 5, latent representations 502, 504 and 506 are shown. Each of the latent representations 502, 504, and 506, may comprise a set of N channels. Each channel may be interpreted as a spatial map indicating a distribution of a certain characteristic feature in the image. Dropout refers to dropping a portion of the channel (e.g., 502). Structured dropout may refer to dropout applied in latent space of a target subnetwork (e.g., target feature 406 of subnetwork A shown in FIG. 4) of a Siamese tracker to mimic target occlusion, for example. In some aspects, different variations of the structured dropout may be applied based on the type of appearance variation or occlusion. For instance, the structured dropout may vary based on whether the occlusion object tracking is a feature occlusion or a patch occlusion. A feature occlusion may refer to occluded parts in the image arising from changes in the target, which lead to the disappearance of some of the characteristic features of the target, while many other characteristic features are still present. One example of feature occlusion may include images of a person with sunglasses or a raincoat obscuring part of the original target features. On the other hand, patch occlusions may refer to compact parts of the target that are blocked by another object, for example. Patch occlusion may, for instance, occur when another object enters the target's view on one of the sides of an image and partly blocks the view of the target.

In one example approach, the latent representation 502 may be modified using a channel structured dropout. In a channel structured dropout, a random set of channels may be dropped from the latent representation. For instance, channels 502$c$-$e$ may be randomly dropped (dropped portions of the channel are shown as speckled portions in FIG. 5) from the latent representation 502. In some aspects, the process of randomly dropping channels (e.g., 502$i$-$j$) may be repeated multiple times and the result may be combined to obtain a final projection. In some aspects, channel structured dropout may be applied when the type of occlusion is a feature occlusion.

In another example approach, the latent representation 504 may be modified using segment structured dropout. In a segment structured dropout, parts of the latent feature representation along the spatial dimension may be dropped. For instance, in the latent representation 504, a portion P of each channel of the latent representation 504 dropped. In some aspects, segment dropout may be applied when the type of occlusion is a patch occlusion.

In another example approach, the latent representation 506 may be modified using a slice structured dropout. In a slice structured dropout, one or more entire edges of the channel may be dropped. Because occlusion may stochastically occur in any part of a target, segment dropouts are also stochastic. However, this may also mean that to match optimally to an occluded target, a large number of segment dropouts may be applied, which may increase the computational footprint. In one example of a patch occlusion, a target may be occluded on one of the sides of the target (e.g., a top portion, a bottom portion, a left side, or a right side). For example, pedestrians may include each other from either the left side or the right side. Thus, instead of sampling all random locations, a predefined set of occlusion patches sampled from each of the different sides or edges of the image may be iterated to cover most cases of occlusion, and therefore achieve a good trade-off with complexity. For instance, in the latent representation 506, a slice S of each channel may be dropped.

In one configuration, dropout sampling and rotation-related augmentation approaches are combined into a single end-to-end latent space enrichment (LSE) framework for robust inference during tracking. Aspects of the present disclosure may be implemented as an add-on to a Siamese tracker.

In one configuration, the dropout-based inference methods are implemented as a part of the model architecture. The model learns to infer from the various samples obtained through dropout sampling. Thus, aspects of the present disclosure are directed to an LSE strategy for performing augmentations in the latent space using the proposed dropout methods and infers over the results to determine the final prediction.

As discussed, a dropout scheme mimics the behavior of occlusion and appearance variations. An ensemble of multiple dropouts during an inference phase improves the performance of the tracking model. Different dropout strategies for robust inference may be used. The dropout strategies include, but are not limited to, channel dropout, segment dropout, and slice dropout.

An LSE strategy may be used for tracking in view of rotation-related appearance variations. An end-to-end LSE framework is used for robust inference based on rotation and dropout sampling.

Figure 6A:
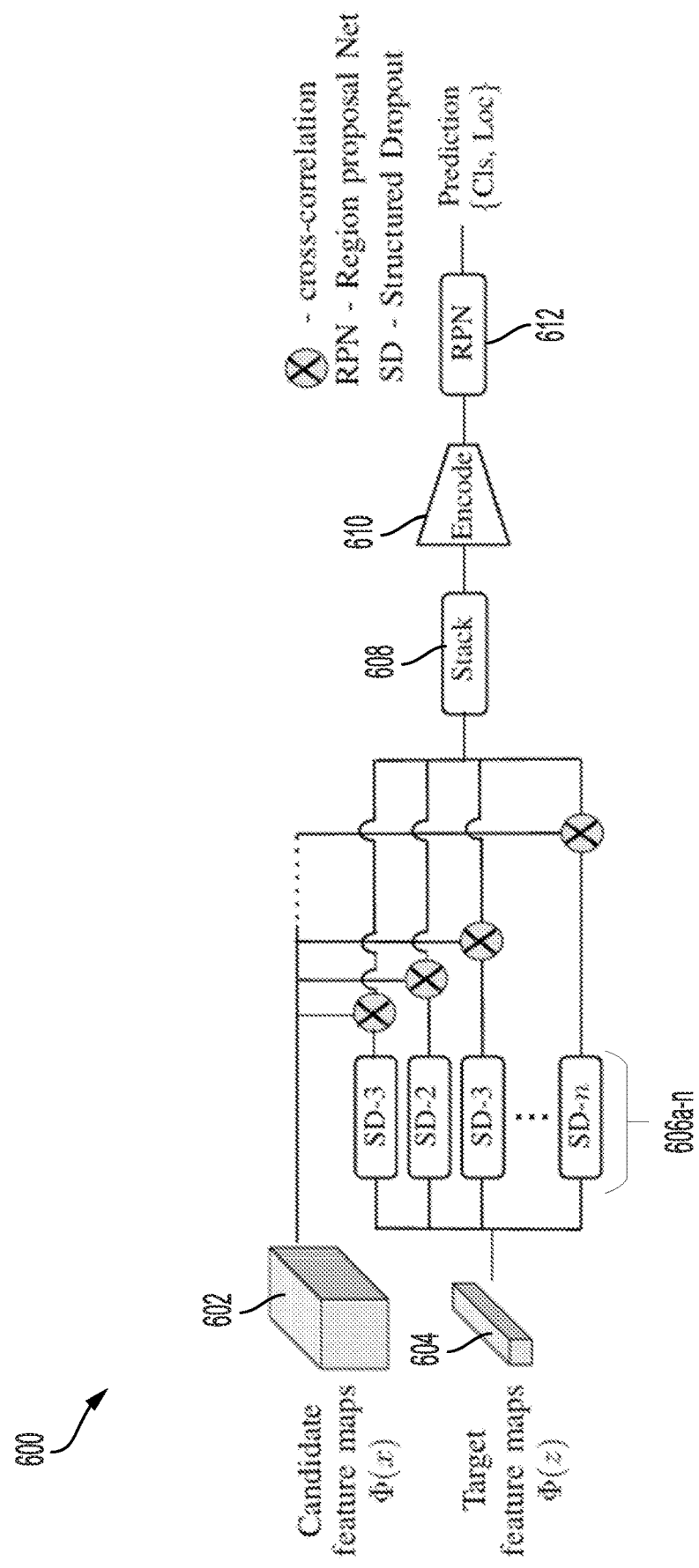
FIG. 6A-B are block diagrams illustrating example architectures for structured dropout, according to aspects of the present disclosure.
Figure 6B:
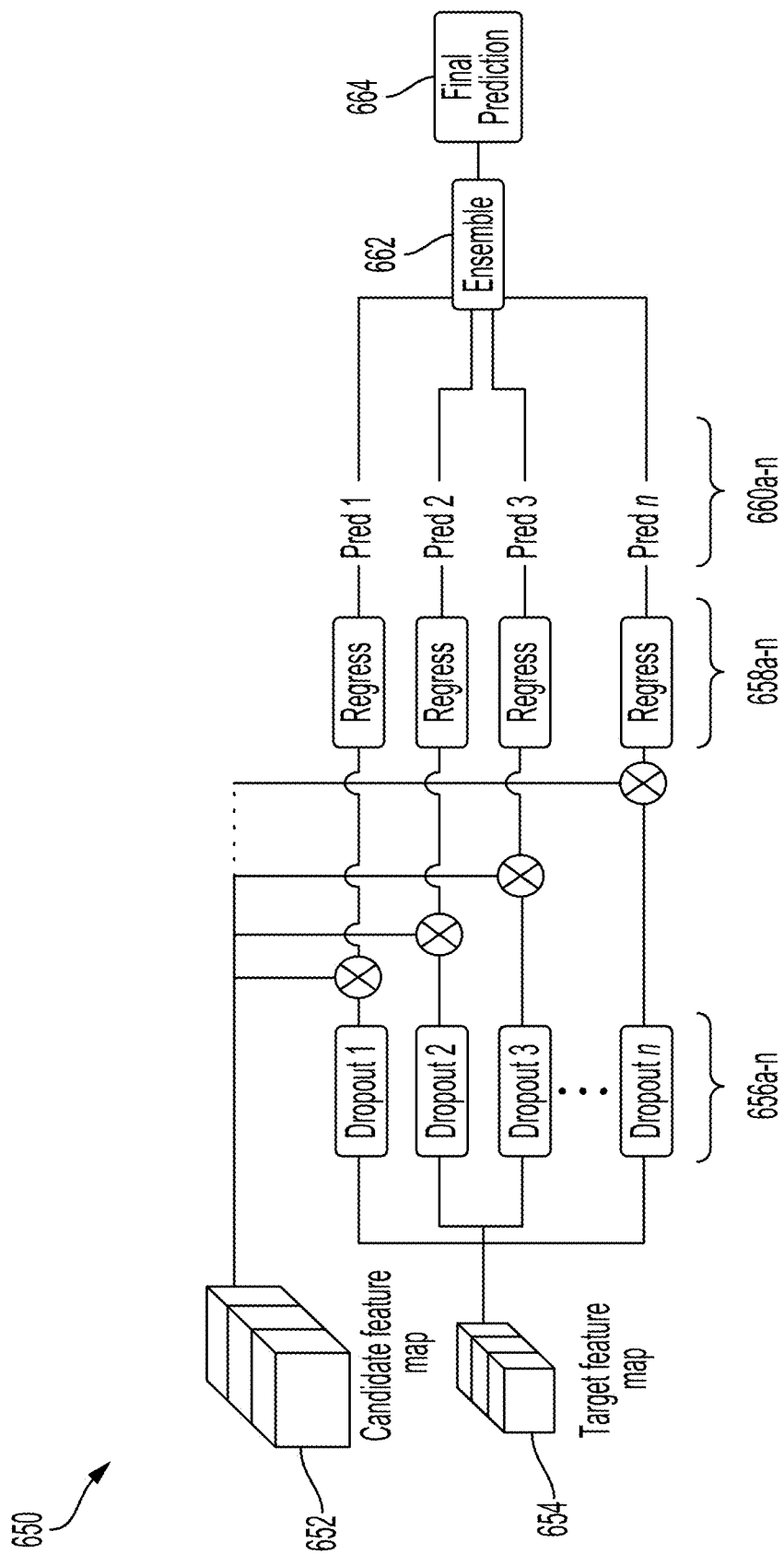

FIG. 6A-B are block diagrams illustrating example architectures 600, 650 for structured dropout, according to aspects of the present disclosure. Rather than combining multiple dropout predictions explicitly, activation maps may be directly combined using a small encoder network, for example. That is, an implicit approach to producing an inference may be used. In the implicit approach, the example architectures 600 may be trained end-to-end to produce a single prediction (e.g., localization of the target image). As shown in FIG. 6A, the example architecture 600 receives candidate feature maps 602 and target feature maps 604. The candidate feature maps 602 may correspond to a candidate image (e.g., 404 of FIG. 4). The target feature maps 604 may correspond to a target image (e.g., 402 of FIG. 4). The target feature maps 604 may be processed by applying a structured dropout strategy to the target feature maps 604 (e.g., 502, 504, and 506) to produce n feature map samples 606a-n (e.g., SD-3 may represent a slice dropout, SD-2 may represent a segment dropout). The feature map samples 606a-n may be stacked 608 and passed through a set of convolution layers of encode block 610. The output of encode block 610 may be supplied to a regression block 612 to generate a prediction (e.g., location of the target image (e.g., 402) within the candidate image (e.g., 404)).

On the other hand the implementation shown in FIG. 6B, a set of prediction (660a-n) may be explicitly generated. The example architecture 650 receives candidate feature maps 652 and target feature maps 654. The target feature maps 654 may be processed by applying a structured dropout strategy to the target feature maps 654 (e.g., 502, 504, and 506) to produce n feature map samples 656a-n (e.g., SD-1 may represent a channel dropout, SD-2 may represent a segment dropout). For channel dropout, a fraction of the channels of the feature map (e.g., 654) to be dropped at the $i^{th}$ inference step may be expressed as $\gamma_i$. The modified feature maps (e.g., 656a-n) may be cross-correlated with the candidate feature map and subjected to a regression block 658a-n to generate a set of predictions (e.g., a prediction at time steps t). The prediction (e.g., 660a-n) at each step may be represented by $D_{t,i}$ $\{y_{t,i}, s_{t,i}\}$ where $y_{t,i}$ and $s_{t,i}$ denote the predicted bounding box and their respective confidence score for the $i^{th}$ forward pass at a time step t. From n forward passes, the set of predictions may then be denoted as $D_{t,i}$ $\{D_{t,1}, D_{t,2}, \ldots, D_{t,n}\}$. The final prediction $\bar{D}_t$.

Figure 7:
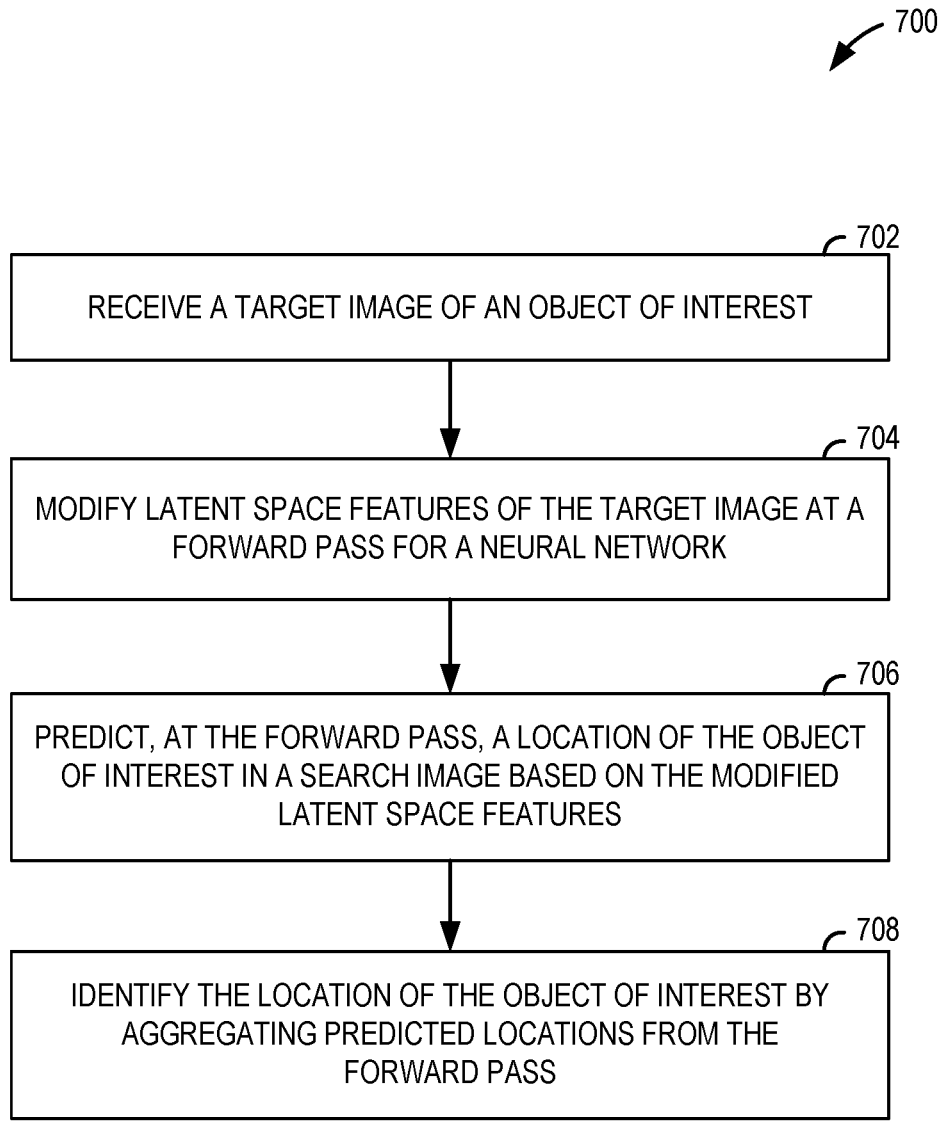
FIG. 7 illustrates a flow diagram for a method, in accordance with aspects of the present disclosure.

FIG. 7 illustrates a flow diagram for a method 700, according to an aspect of the present disclosure. The method 700 is an example of latent space enrichment for robust inference in object tracking by an artificial neural network. As shown in FIG. 7, at block 702, the artificial neural network receives a target image of an object of interest. The target image may be cropped from one frame of a sequence of frames. In one configuration, the artificial neural network is a Siamese neural network.

Additionally, as shown in FIG. 7, at block 704, the artificial neural network modifies latent space features of the target image at a forward pass. For example, the latent space features may be modified by dropping one or more channels of the latent space features, dropping a channel corresponding to a slice of the latent space features, or dropping one or more features of the latent space features.

As shown in FIG. 7, at block 706, an artificial neural network predicts, at the forward pass, a location of the object of interest in a search image based on the modified latent space features. For example, the artificial neural network convolves the modified latent space features and features of the search image. Additionally, the artificial neural network predicts the location of the object of interest in the search image based on the convolution. Finally, as shown in FIG. 7, at block 708, an artificial neural network identifies the location of the object of interest by aggregating predicted locations from the forward pass.

In one aspect, the receiving means, the determining means, and quantizing means, and/or the generating means may be the CPU 102, program memory associated with the CPU 102, the GPU 104, NPUs 108, the dedicated memory block 118, and or the fully connected layers 362 configured to perform the functions recited. In another configuration, the aforementioned means may be any module or any apparatus configured to perform the functions recited by the aforementioned means.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

Implementation examples are provided in the following numbered clauses:

1. A method, comprising:
   receiving a target image of an object of interest;
   modifying latent space features of the target image at a forward pass for a neural network;
   predicting, at the forward pass, a location of the object of interest in a search image based on the modified latent space features; and
   identifying the location of the object of interest by aggregating predicted locations from the forward pass.

2. The method of clause 1, further comprising modifying the latent space features by dropping at least one channel of the latent space features, dropping a channel corresponding to a slice of the latent space features, or dropping at least one feature of the latent space features.

3. The method of any of clauses 1 or 2, in which dropping the at least one channel of the latent space features and dropping the at least one feature of the latent space features comprise stochastic dropouts.

4. The method of any of clauses 1 or 2, in which dropping a channel corresponding to the slice of the latent space features comprises a non-stochastic dropout.

5. The method of any of clauses 1-4, in which the neural network comprises a Siamese neural network.

6. The method of any of clauses 1-5, further comprising convolving the modified latent space features and features of the search image.

7. The method of any of clauses 1-6, further comprising predicting the location of the object of interest in the search image based on the convolution of the modified latent space features and features of the search image.

8. An apparatus, comprising:
   a memory, and at least one processor operatively coupled to the memory, the memory and the at least one processor configured:
   to receive a target image of an object of interest;
   to modify latent space features of the target image at a forward pass for a neural network;
   to predict, at the forward pass, a location of the object of interest in a search image based on the modified latent space features; and
   to identify the location of the object of interest by aggregating predicted locations from the forward pass.

9. The apparatus of clause 8, in which the at least one processor is further configured to modify the latent space features by dropping at least one channel of the latent space features, to drop a channel corresponding to a slice of the latent space features, or to drop at least one feature of the latent space features.

10. The apparatus of any of clauses 8 or 9, in which the at least one processor is further configured to drop the at least one channel of the latent space features and to drop the at least one feature of the latent space features with stochastic dropouts.

11. The apparatus of any of clauses 8 or 9, in which the at least one processor is further configured to drop a channel corresponding to the slice of the latent space features comprising a non-stochastic dropout.

12. The apparatus of any of clauses 8-11, in which the neural network comprises a Siamese neural network.

13. The apparatus of any of clauses 8-12, in which the at least one processor is further configured to convolve the modified latent space features and features of the search image.

14. The apparatus of any of clauses 8-13, in which the at least one processor is further configured to predict the location of the object of interest in the search image based on the convolution of the modified latent space features and features of the search image.

15. An apparatus, comprising:
    means for receiving a target image of an object of interest;
    means for modifying latent space features of the target image at a forward pass for a neural network;
    means for predicting, at the forward pass, a location of the object of interest in a search image based on the modified latent space features; and
    means for identifying the location of the object of interest by aggregating predicted locations from the forward pass.

16. The apparatus of clause 15, further comprising means for modifying the latent space features by dropping at least one channel of the latent space features, dropping a channel corresponding to a slice of the latent space features, or dropping at least one feature of the latent space features.

17. The apparatus of any of clauses 15 or 16, in which the means for dropping the at least one channel of the latent space features and means for dropping the at least one feature of the latent space features comprise means for a stochastic dropout.

18. The apparatus of any of clauses 15 or 16, in which the means for dropping a channel corresponding to the slice of the latent space features comprises means for a non-stochastic dropout.

19. The apparatus of any of clauses 15-18, in which the neural network comprises a Siamese neural network.

20. The apparatus of any of clauses 15-19, further comprising means for convolving the modified latent space features and features of the search image.

21. The apparatus of any of clauses 15-20, further comprising means for predicting the location of the object of interest in the search image based on the convolution of the modified latent space features and features of the search image.

22. A non-transitory computer-readable medium having program code recorded thereon, the program code executed by at least one processor and comprising:
    program code to receive a target image of an object of interest;
    program code to modify latent space features of the target image at a forward pass for a neural network;
    program code to predict, at the forward pass, a location of the object of interest in a search image based on the modified latent space features; and
    program code to identify the location of the object of interest by aggregating predicted locations from the forward pass.

23. The non-transitory computer-readable medium of clause 22, in which the program code to modify the latent space features comprises: program code to drop at least one channel of the latent space features, program code to drop a channel corresponding to a slice of the latent space features, or program code to drop at least one feature of the latent space features.

24. The non-transitory computer-readable medium of any of clauses 22 or 23, in which the program code to drop the at least one channel of the latent space features and the program code to drop the at least one feature of the latent space features comprise program code to perform stochastic dropouts.

25. The non-transitory computer-readable medium of any of clauses 22 or 23, in which the program code to drop a channel corresponding to the slice of the latent space features comprises program code to perform non-stochastic dropout.

26. The non-transitory computer-readable medium of any of clauses 22-25, in which the neural network comprises a Siamese neural network.

27. The non-transitory computer-readable medium of any of clauses 22-26, further comprising program code to convolve the modified latent space features and features of the search image.

28. The non-transitory computer-readable medium of any of clauses 22-27, further comprising program code to predict the location of the object of interest in the search image based on the convolution of the modified latent space features and features of the search image.

As used, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

Some aspects are described herein in connection with thresholds. As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method, comprising:
   receiving a target image of an object of interest;
   extracting latent space features of the target image;
   modifying the latent space features of the target image at a forward pass of a neural network using a structured dropout to model one or more appearance variations of the target image;
   predicting, at the forward pass, a location of the object of interest in a search image based on the modified latent space features; and
   identifying the location of the object of interest by aggregating predicted locations from the forward pass.

2. The method of claim 1, in which the structured dropout comprises at least one of dropping at least one channel of the latent space features, dropping a channel corresponding to a slice of the latent space features, or dropping at least one feature of the latent space features.

3. The method of claim 2, in which dropping the at least one channel of the latent space features and dropping the at least one feature of the latent space features comprise stochastic dropouts.

4. The method of claim 2, in which dropping a channel corresponding to the slice of the latent space features comprises a non-stochastic dropout.

5. The method of claim 1, in which the neural network comprises a Siamese neural network.

6. The method of claim 1, further comprising convolving the modified latent space features and features of the search image.

7. The method of claim 6, further comprising predicting the location of the object of interest in the search image based on the convolution of the modified latent space features and features of the search image.

8. An apparatus, comprising:
   at least one memory, and
   at least one processor operatively coupled to the memory, the at least one memory and the at least one processor configured to:
   receive a target image of an object of interest;
   extract latent space features of the target image;
   modify the latent space features of the target image at a forward pass of a neural network using a structured dropout to model one or more appearance variations of the target image;
   predict, at the forward pass, a location of the object of interest in a search image based on the modified latent space features; and
   identify the location of the object of interest by aggregating predicted locations from the forward pass.

9. The apparatus of claim 8, in which the structured dropout comprises at least one of dropping at least one channel of the latent space features, dropping a channel corresponding to a slice of the latent space features, or dropping at least one feature of the latent space features.

10. The apparatus of claim 9, in which the at least one processor is further configured to drop the at least one channel of the latent space features and to drop the at least one feature of the latent space features with stochastic dropouts.

11. The apparatus of claim 9, in which the at least one processor is further configured to drop a channel corresponding to the slice of the latent space features comprising a non-stochastic dropout.

12. The apparatus of claim 8, in which the neural network comprises a Siamese neural network.

13. The apparatus of claim 8, in which the at least one processor is further configured to convolve the modified latent space features and features of the search image.

14. The apparatus of claim 13, in which the at least one processor is further configured to predict the location of the object of interest in the search image based on the convolution of the modified latent space features and features of the search image.

15. An apparatus, comprising:
means for receiving a target image of an object of interest;
means for extracting latent space features of the target image;
means for modifying the latent space features of the target image at a forward pass of a neural network using a structured dropout to model one or more appearance variations of the target image;
means for predicting, at the forward pass, a location of the object of interest in a search image based on the modified latent space features; and
means for identifying the location of the object of interest by aggregating predicted locations from the forward pass.

16. The apparatus of claim 15, in which the structured dropout comprises at least one of dropping at least one channel of the latent space features, dropping a channel corresponding to a slice of the latent space features, or dropping at least one feature of the latent space features.

17. The apparatus of claim 16, in which the means for dropping the at least one channel of the latent space features and means for dropping the at least one feature of the latent space features comprise means for performing a stochastic dropout.

18. The apparatus of claim 16, in which the means for dropping a channel corresponding to the slice of the latent space features comprises means for performing a non-stochastic dropout.

19. The apparatus of claim 15, in which the neural network comprises a Siamese neural network.

20. The apparatus of claim 15, further comprising means for convolving the modified latent space features and features of the search image.

21. The apparatus of claim 20, further comprising means for predicting the location of the object of interest in the search image based on the convolution of the modified latent space features and features of the search image.

22. A non-transitory computer-readable medium having program code recorded thereon, the program code executed by at least one processor and comprising:
program code to receive a target image of an object of interest;
program code to extract latent space features of the target image;
program code to modify the latent space features of the target image at a forward pass of a neural network using a structured dropout to model one or more appearance variations of the target image;
program code to predict, at the forward pass, a location of the object of interest in a search image based on the modified latent space features; and
program code to identify the location of the object of interest by aggregating predicted locations from the forward pass.

23. The non-transitory computer-readable medium of claim 22, in which the structured dropout comprises at least one of dropping at least one channel of the latent space features, dropping a channel corresponding to a slice of the latent space features, or dropping at least one feature of the latent space features.

24. The non-transitory computer-readable medium of claim 23, in which the program code to drop the at least one channel of the latent space features and the program code to drop the at least one feature of the latent space features comprise program code to perform stochastic dropouts.

25. The non-transitory computer-readable medium of claim 23, in which the program code to drop a channel corresponding to the slice of the latent space features comprises program code to perform non-stochastic dropouts.

26. The non-transitory computer-readable medium of claim 22, in which the neural network comprises a Siamese neural network.

27. The non-transitory computer-readable medium of claim 22, further comprising program code to convolve the modified latent space features and features of the search image.

28. The non-transitory computer-readable medium of claim 27, further comprising program code to predict the location of the object of interest in the search image based on the convolution of the modified latent space features and features of the search image.

* * * * *